US012647765B2

(12) United States Patent
Sander et al.

(10) Patent No.: US 12,647,765 B2
(45) Date of Patent: Jun. 2, 2026

(54) METHODS AND DEVICES FOR NETWORK FUNCTION DISCOVERY AND SELECTION

(71) Applicant: Telefonaktiebolaget LM Ericsson (publ), Stockholm (SE)

(72) Inventors: Ann-Christine Sander, Skepplanda (SE); Yunjie Lu, Shanghai (CN); Qian Chen, Mölndal (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 533 days.

(21) Appl. No.: 18/029,871

(22) PCT Filed: Jun. 22, 2021

(86) PCT No.: PCT/EP2021/067013
§ 371 (c)(1),
(2) Date: Mar. 31, 2023

(87) PCT Pub. No.: WO2022/069089
PCT Pub. Date: Apr. 7, 2022

(65) Prior Publication Data
US 2023/0370830 A1 Nov. 16, 2023

(30) Foreign Application Priority Data

Oct. 1, 2020 (WO) ................ PCT/CN2020/119775

(51) Int. Cl.
*H04W 4/00* (2018.01)
*H04W 8/00* (2009.01)
*H04W 76/10* (2018.01)
(52) U.S. Cl.
CPC ........... *H04W 8/005* (2013.01); *H04W 76/10* (2018.02)

(58) Field of Classification Search
CPC ....... H04W 8/005; H04W 76/10; H04W 8/00; H04W 48/18; H04W 76/12; H04W 88/18
(Continued)

(56) References Cited

U.S. PATENT DOCUMENTS

2017/0303259 A1* 10/2017 Lee ........................ H04W 28/16
2018/0234942 A1* 8/2018 Kim .................... H04L 61/5014
(Continued)

FOREIGN PATENT DOCUMENTS

CN 110876154 A 3/2020
EP 3716692 A1 9/2020
(Continued)

OTHER PUBLICATIONS

NTT Docomo; "Clarification on SMF identifier in HR roaming"; 3GPP TSG-SA2 Meeting #135; Oct. 14-18, 2019; S2-1910215; 7 pages.
(Continued)

*Primary Examiner* — Marceau Milord
(74) *Attorney, Agent, or Firm* — Sage Patent Group

(57) ABSTRACT

The present disclosure provides a method for a UE service management network element to affect profile of the UE service management network element stored in a network function discovery network element in a communication network, including: sending a request to the network function discovery network element, wherein the request indicates capability of the UE service management network element. Other corresponding network elements, and the corresponding devices, computer readable storage medium, carrier, etc. thereof are also provided.

20 Claims, 9 Drawing Sheets

(58) Field of Classification Search

USPC ............................................................ 370/329

See application file for complete search history.

(56) References Cited

U.S. PATENT DOCUMENTS

| | | | | |
|---|---|---|---|---|
| 2018/0317157 A1* | 11/2018 | Baek | ..................... | H04W 28/16 |
| 2019/0045037 A1* | 2/2019 | Sukhomlinov | ....... | G06F 9/5077 |
| 2019/0045572 A1* | 2/2019 | Kim | ..................... | H04W 76/34 |
| 2019/0075511 A1* | 3/2019 | Ryu | .................... | H04W 68/005 |
| 2019/0239147 A1* | 8/2019 | Chun | ................... | H04W 88/06 |
| 2020/0107247 A1* | 4/2020 | Loffe | ................... | H04W 76/10 |
| 2020/0137174 A1* | 4/2020 | Stammers | .............. | H04L 67/51 |
| 2020/0187088 A1* | 6/2020 | Chun | ................... | H04W 48/02 |
| 2021/0112513 A1* | 4/2021 | Chun | ................... | H04W 60/00 |
| 2021/0144790 A1* | 5/2021 | Faccin | .................. | H04W 76/18 |
| 2022/0038986 A1* | 2/2022 | Soliman | ............... | H04W 40/02 |
| 2022/0039004 A1* | 2/2022 | Soliman | .................. | H04W 8/18 |
| 2022/0060886 A1* | 2/2022 | Zhang | ..................... | H04L 69/22 |
| 2022/0272165 A1* | 8/2022 | Bawa | ................. | H04L 61/4541 |
| 2023/0388914 A1* | 11/2023 | Qiao | ................... | H04W 60/005 |
| 2024/0090079 A1* | 3/2024 | Talebi Fard | .......... | H04W 68/00 |

FOREIGN PATENT DOCUMENTS

| | | | |
|---|---|---|---|
| WO | 2019193129 A1 | 10/2019 | |
| WO | 2020104925 A1 | 5/2020 | |

OTHER PUBLICATIONS

International Search Report and Written Opinion of the International Searching Authority, PCT/EP2021/067013, mailed Oct. 12, 2021, 19 pages.

3GPP TS 23.502 v16.4.0 (Mar. 2020); 3rd Generation Partnership Project; Technical Specification Group Services and System Aspects; Procedures for the 5G System (5GS); Stage 2 (Release 16); 582 pages.

ZTE, "MA-PDU Capability for Atsss," 3GPP TSG-CT WG4 Meeting #90, C4-191141, Xi'an, P.R. China, Apr. 8-12, 2019, 13 pages.

3GPP TS 23.501 v16.6.0 (Sep. 2020); 3rd Generation Partnership Project; Technical Specification Group Services and System Aspects; System architecture for the 5G System (5GS); Stage 2 (Release 16); 447 pages.

3GPP TS 29.510 v16.4.0 (Jul. 2020); 3rd Generation Partnership Project; Technical Specification Group Core Network and Terminals; 5G System; Network Function Repository Services; Stage 3 (Release 16); 192 pages.

Office Action mailed Jun. 21, 2024 for Japanese Patent Application No. 2023-520259, 4 pages.

NTT Docomo; "Delegated discovery clean-up"; 3GPP TSG-SA2 Meeting #134; Jun. 24-28, 2021; Change Request; S2-1907392; 11 pages.

Nokia et al.; "TS 23.502: NF Capacity reporting towards NRF"; 3GPP TSG SA WG2 #123; Oct. 23-27, 2017; S2-177061; 9 pages.

* cited by examiner

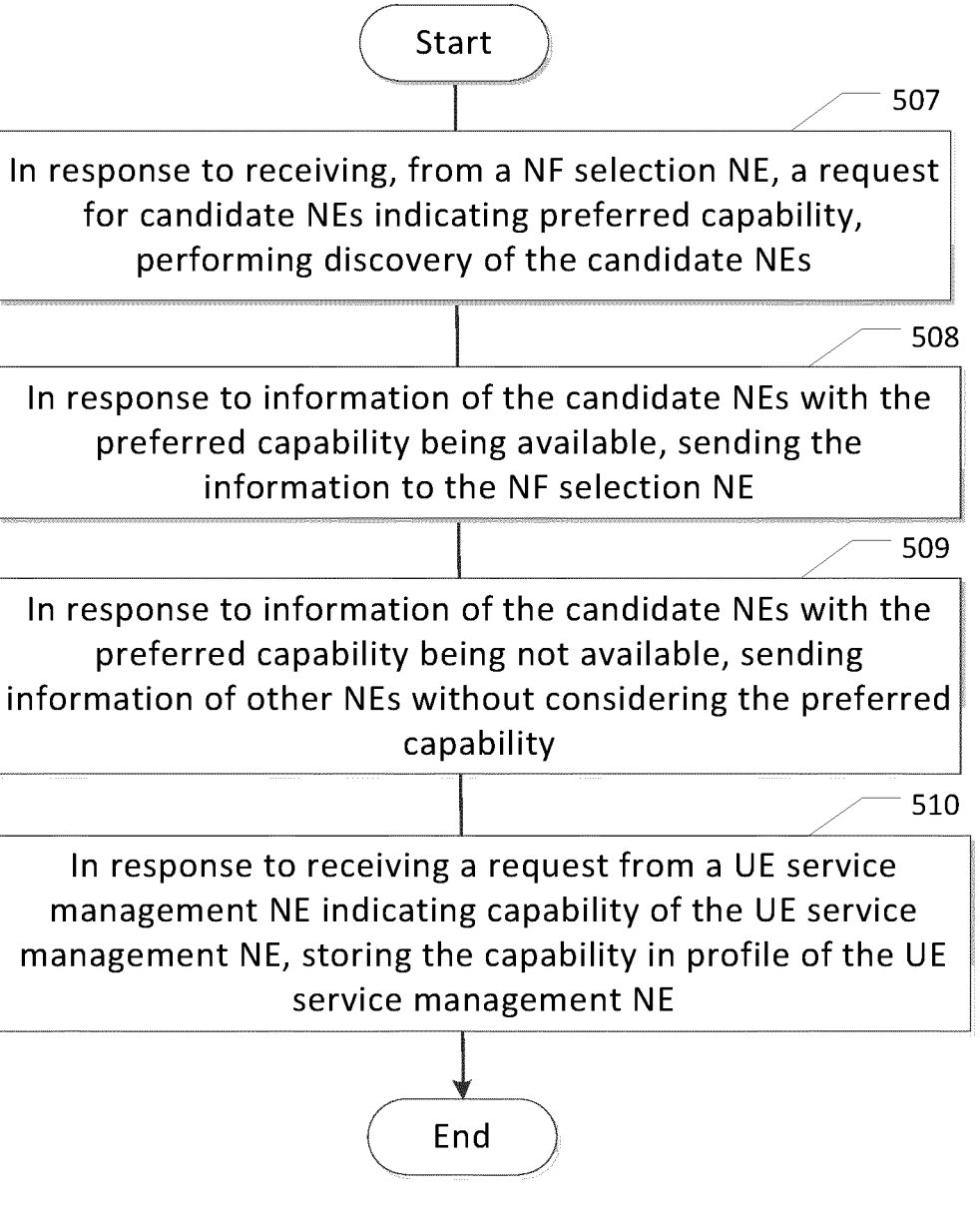

Start

507

In response to receiving, from a NF selection NE, a request for candidate NEs indicating preferred capability, performing discovery of the candidate NEs

508

In response to information of the candidate NEs with the preferred capability being available, sending the information to the NF selection NE

509

In response to information of the candidate NEs with the preferred capability being not available, sending information of other NEs without considering the preferred capability

510

In response to receiving a request from a UE service management NE indicating capability of the UE service management NE, storing the capability in profile of the UE service management NE End

METHODS AND DEVICES FOR NETWORK FUNCTION DISCOVERY AND SELECTION

CROSS REFERENCE TO RELATED APPLICATIONS

This application is a 35 U.S.C. § 371 national stage application of PCT International Application No. PCT/EP2021/067013 filed on Jun. 22, 2021, which in turn claims foreign priority to International Patent Application No. PCT/CN2020/119775, filed on Oct. 1, 2020, the disclosures and content of which are incorporated by reference herein in their entirety.

TECHNICAL FIELD

The present disclosure generally relates to the technical field of telecommunications, and more specifically to methods, network elements, devices, computer-readable storage and carrier, etc. for network function discovery, such as a UE service management network element discovery and selection.

BACKGROUND

This section is intended to provide a background to the various embodiments of the technology described in this disclosure. The description in this section may include concepts that could be pursued, but are not necessarily ones that have been previously conceived or pursued. Therefore, unless otherwise indicated herein, what is described in this section is not prior art to the description and/or claims of this disclosure and is not admitted to be prior art by the mere inclusion in this section.

In Evolved Packet Core (EPC), when a User Equipment (UE) attaches the network, or in any case that Packet Data Network Gateway (PGW)/serving Gateway (SGW) selection is required, MME will do the selection with the aid of DNS.

In the 5G work in 3GPP it has been agreed to do a further split between Mobility Management (MM) and Session Management (SM) compared to EPC, where MME supports both MM and some SM functionality. The Access and Mobility Management Function (AMF) supports MM functionality and the Session Management Function (SMF) supports SM functionality.

In the 5G architecture it has been agreed that the AMF selects the SMF. In 5G core network there is a new network entity called Network Repository Function (NRF), that is used to assist in Network Function (NF) Selection e.g. SMF selection. The AMF queries the NRF to get the SMF information. The AMF can then, based on knowledge of the SMF information from the NRF, select the SMF.

SUMMARY

It is one or more object(s) of the present disclosure to address one or more of the problems arisen in service subscriptions.

According to a first embodiment of the disclosure, there is provided a method for a UE service management network element to affect profile of the UE service management network element stored in a network function discovery network element in a communication network, comprising: sending a request to the network function discovery network element, wherein the request indicates capability of the UE service management network element.

According to a second embodiment of the disclosure, there is provided a method for a network function selection network element to select a UE service management network element, in a communication network, comprising: sending a request to a network function discovery network element for information of one or more candidate network elements from which the UE service management network element will be selected, wherein the request indicates a preferred capability of the UE service management network element.

According to a third embodiment of the disclosure, there is provided a method for a network function discovery network element in a communication network, comprising: in response to receiving, from a network function selection network element, a request for information of one or more candidate network elements from which a UE service management network element will be selected, wherein the request indicates a preferred capability of the UE service management network element: performing discovery of the one or more candidate network elements with the preferred capability of the UE service management network element, and in response to determining from the discovery that information of the one or more candidate network elements with the preferred capability of the UE service management network element is available: sending, to the network function selection network element, information of the one or more candidate network elements with the preferred capability of the UE service management network element, which information indicates a capability of the one or more candidate network elements including the preferred capability.

According to a fourth embodiment of the disclosure, there is provided a UE service management network element to affect profile of the UE service management network element stored in a network function discovery network element, operative in a communication network, comprising: a request sending component, configured to send a request to the network function discovery network element, wherein the request indicates a capability of the UE service management network element.

According to a fifth embodiment of the disclosure, there is provided a network function selection network element to select a UE service management network element, operative in a communication network, comprising: a discovery request component, configured to send a request to a network function discovery network element for information of one or more candidate network elements from which the UE service management network element will be selected, wherein the request indicates a preferred capability of the UE service management network element.

According to a sixth embodiment of the disclosure, there is provided a network function discovery network element operative in a communication network, comprising: discovery component configured to, in response to receiving, from a network function selection network element, a request for information of one or more candidate network elements from which a UE service management network element will be selected, wherein the request indicates a preferred capability of the UE service management network element, perform discovery of the one or more candidate network elements with the preferred capability of the UE service management network element, and a sending component, configured to, in response to determining from the discovery that information of the one or more candidate network elements with the preferred capability of the UE service management network element is available, send, to the network function selection network element, information of the one or more candidate network elements with the preferred capability of the UE service management network element, which information indicates a capability of the candidate network elements including the preferred capability.

According to a seventh embodiment of the disclosure, there is provided a communication device in a network, comprising: a storage adapted to store instructions therein and a processor adapted to execute the instructions to cause the communication device to perform the steps of any of the methods here.

According to an eighth embodiment of the disclosure, there is provided one or more computer-readable storage storing computer-executable instructions thereon, when executed by a computing device, causing the computing device to implement the method of any of any of the methods here.

According to a ninth embodiment of the disclosure, there is provided a computer program, comprising instructions which, when executed on at least one processor, cause the at least one processor to carry out the method according to any one of the methods here.

According to a tenth embodiment of the disclosure, there is provided a carrier containing the computer program of the eighth embodiment, wherein the carrier is one of an electronic signal, optical signal, radio signal, or computer readable storage.

The UE service management network element in the disclosure is a network function element, and may provide service management for a UE, for example a network function element in 5G core or NG core, such as SMF. The network function selection network element in the disclosure is a network function, and may be responsible for selecting a network function from one or more candidates, for example a network function element in 5G core or NG core, such as AMF. The network function discovery network element in the disclosure is a network function element, and may provide network function discovery, for example a network function element in 5G core or NG core, such as NRF.

BRIEF DESCRIPTION OF THE DRAWINGS

The foregoing and other features of this disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and details through use of the accompanying drawings.

4

Figure 5A:
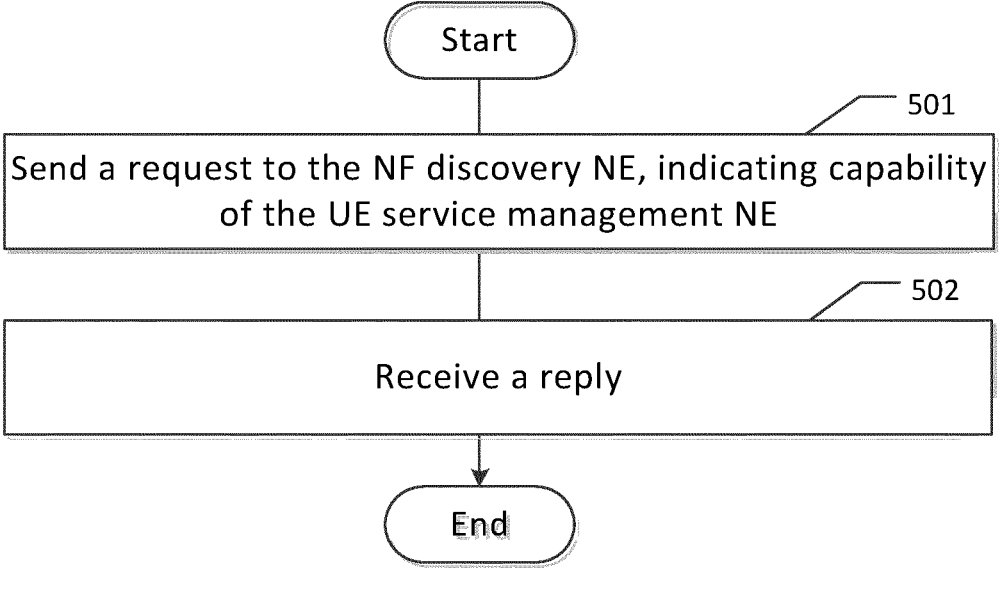

FIG. 5a illustrates a flowchart of an embodiment for a UE service management network element according to embodiments of the present disclosure.

Figure 5B:
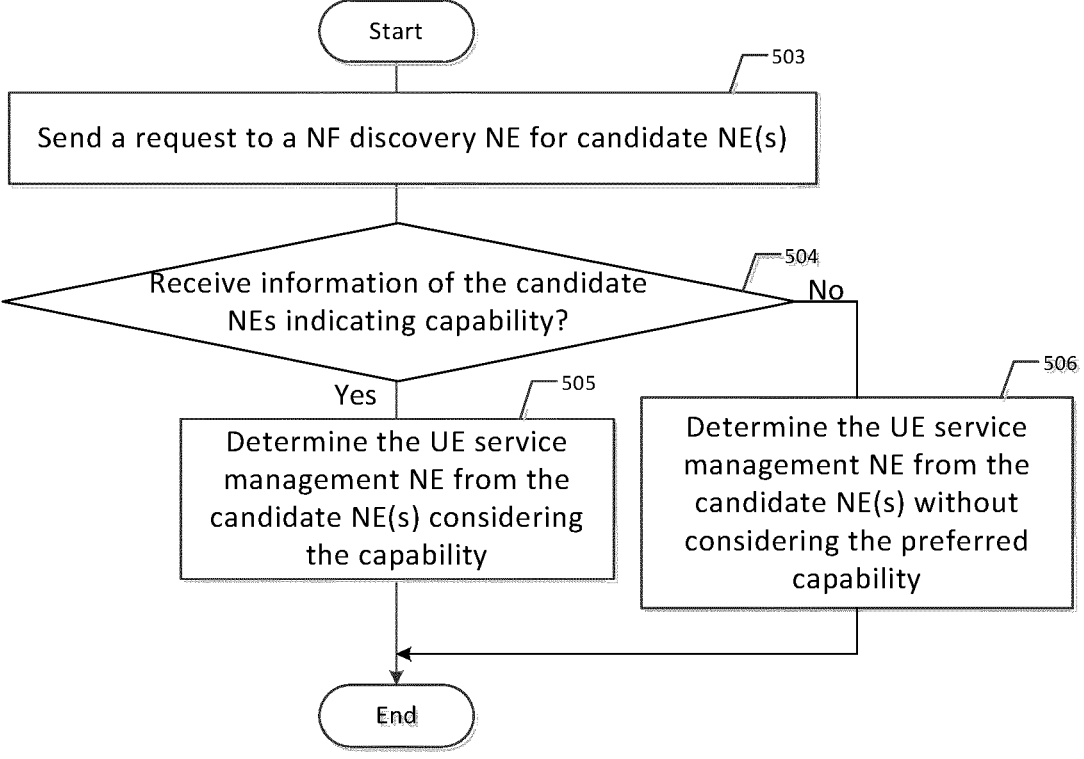

FIG. 5b illustrates a flowchart of an embodiment for a network function selection network element according to embodiments of the present disclosure.

FIG. 5c illustrates a flowchart of an embodiment for a network function discovery network element according to embodiments of the present disclosure.

Figure 5D:
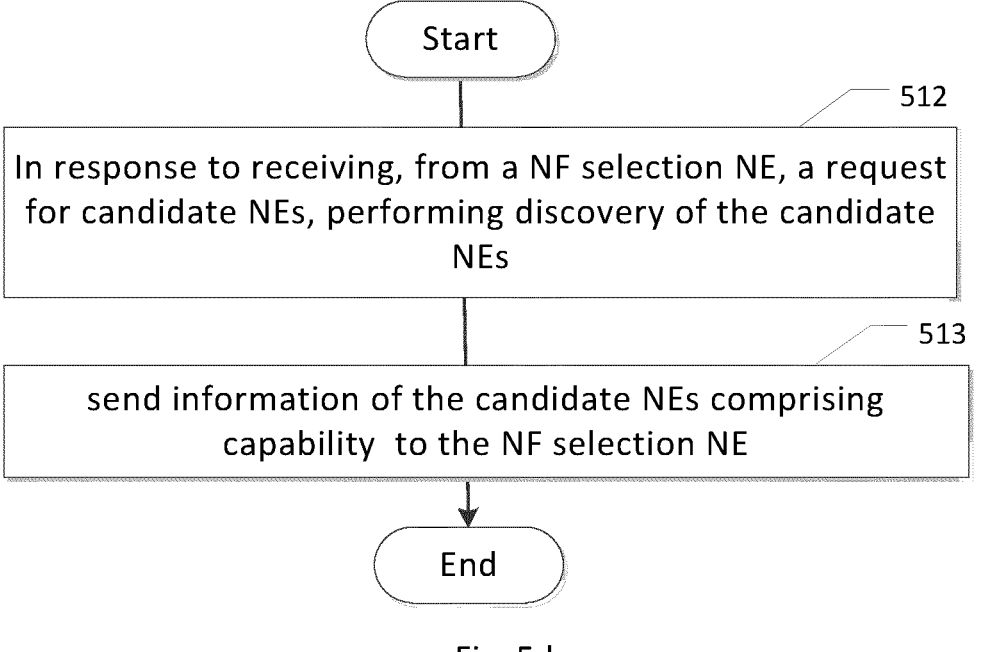

FIG. 5d illustrates another flowchart of an embodiment for a network function discovery network element according to embodiments of the present disclosure.

Figure 6A:
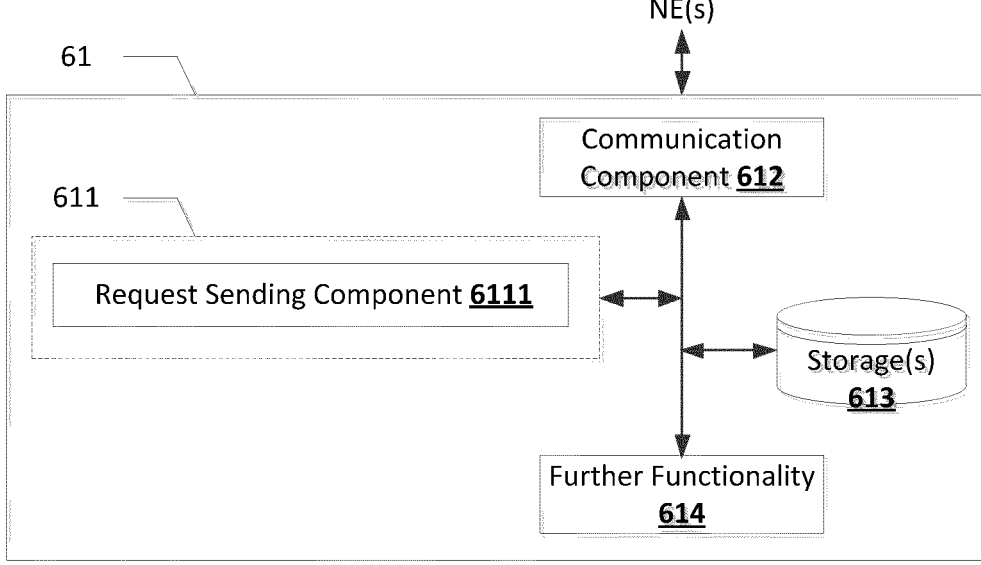

FIG. 6a illustrates a schematic block diagram of a UE service management network element according to embodiments of the present disclosure.

Figure 6B:
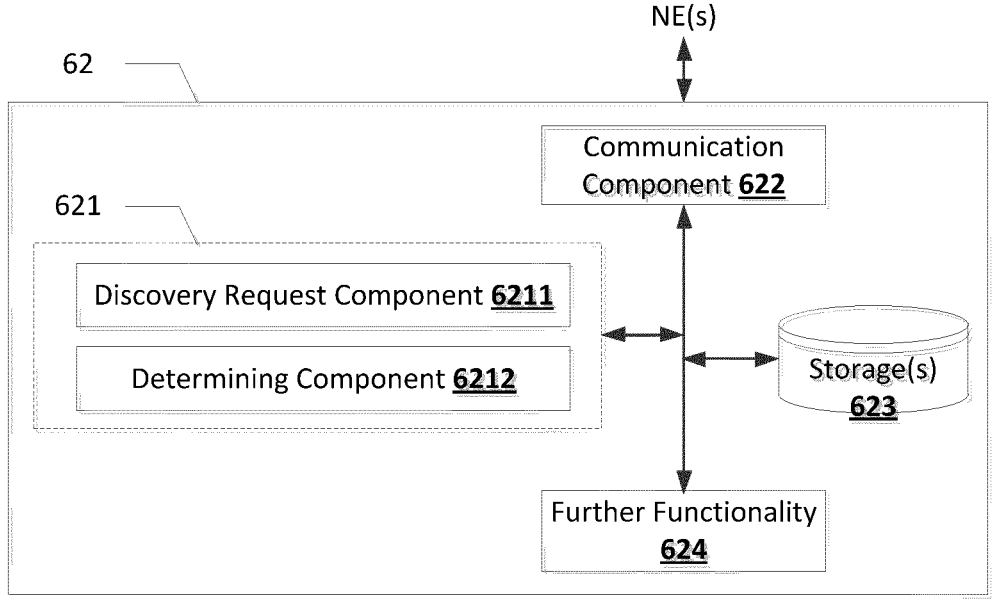

FIG. 6b illustrates a schematic block diagram of a network function selection network element according to embodiments of the present disclosure.

Figure 6C:
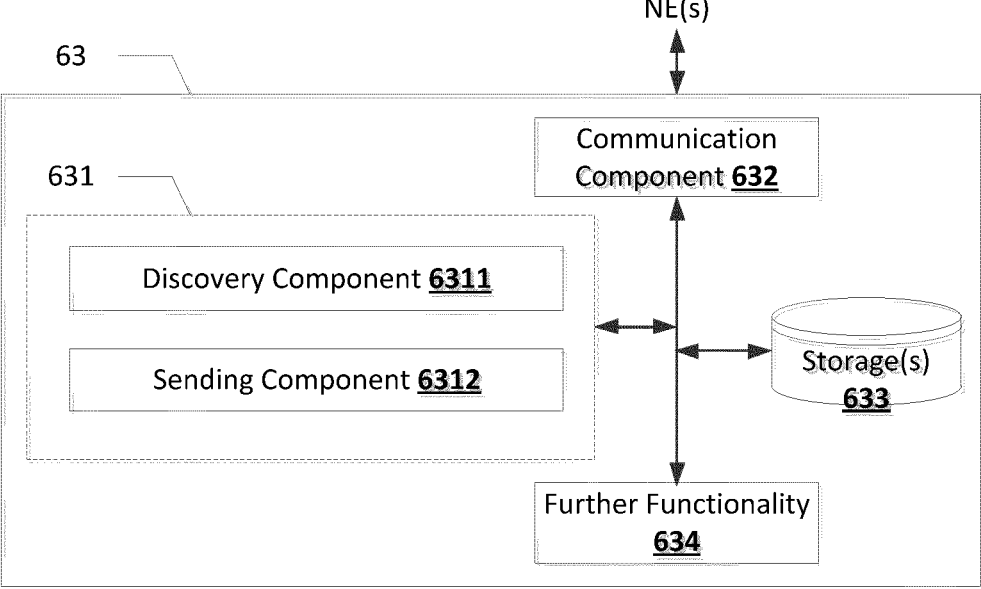

FIG. 6c illustrates a schematic block diagram of a network function discovery network element according to embodiments of the present disclosure.

Figure 7:
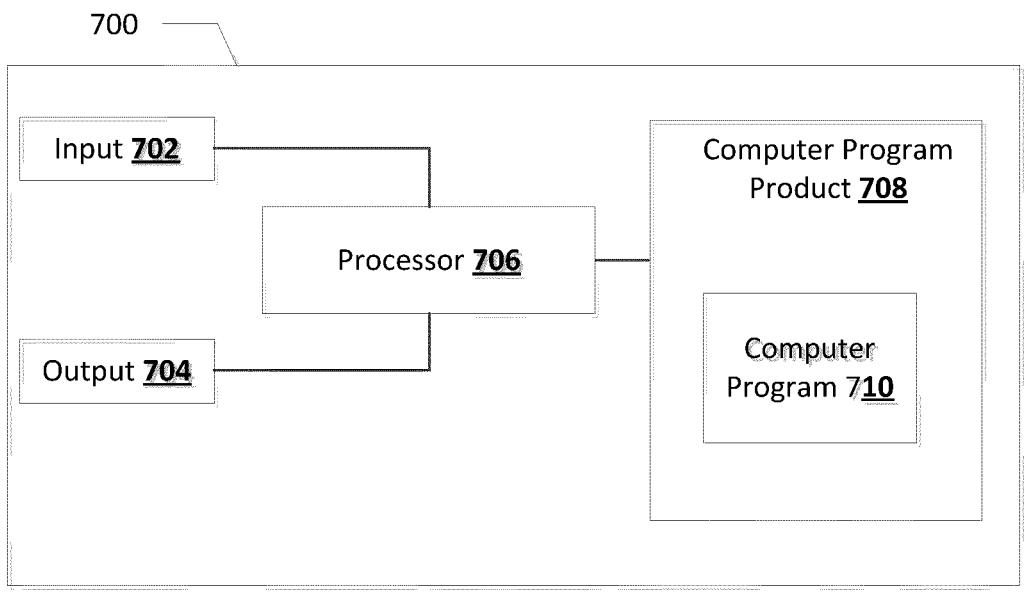

FIG. 7 schematically illustrates an embodiment of an arrangement which may be used for network elements of the present disclosure.

DETAILED DESCRIPTION

Embodiments herein will be described in detail hereinafter with reference to the accompanying drawings, in which embodiments are shown. These embodiments herein may, however, be embodied in many different forms and should not be construed as being limited to the embodiments set forth herein. The elements of the drawings are not necessarily to scale relative to each other. Like numbers refer to like elements throughout.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood. It will be further understood that terms used herein should be interpreted as having a meaning that is consistent with their meaning in the context of this specification and the relevant art and will not be interpreted in an idealized or overly formal sense unless expressly so defined herein, for example, concepts of AMF, SMF, NRF, etc. are generally understood in the context of 3GPP specifications. Though many embodiments herein are described in the context of Next Generation network (such as 5G mobile wireless networks), other networks may also be applicable.

Even though many embodiments are described in the context of SMF discovery and selection, it is noted that embodiments of the present disclosure are not limited to SMF selections, but also applicable to other NF selections as appropriate.

Figure 1:
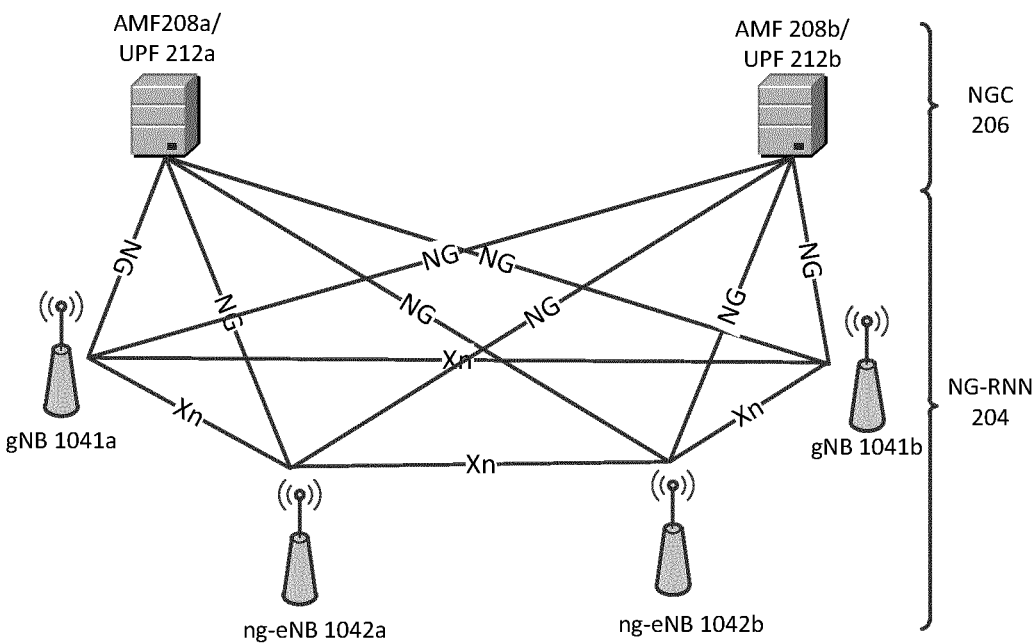
FIG. 1 illustrates a high-level view of an exemplary 5G network architecture where embodiments of the present disclosure may apply.

FIG. 1 illustrates a high-level view of an exemplary NG (such as 5G mobile wireless) network architecture where embodiments of the present disclosure may apply, including a Next Generation Radio Access Network (NG-RAN) 104 and a NG Core (NGC) 106. As shown in the figure, NG-RAN 104 can include gNBs 1041 (e.g., 1041a, 1041b) and ng-eNBs 1042 (e.g., 1042a, 1042b) that are interconnected with each other via respective Xn interfaces. The gNBs and ng-eNBs are also connected via the NG interfaces to NGC 106, more specifically to the AMF (Access and Mobility Management Function) 208 (e.g., AMFs 208a, 208b) via respective NG-C interfaces and to the UPF (User Plane Function) 212 (e.g., UPFs 212a, 212b) via respective NG-U interfaces.

Each of the gNBs 1041 can support the NR radio interface, including frequency division duplexing (FDD), time division duplexing (TDD), or a combination thereof. In contrast, each of ng-eNBs 1042 supports the LTE radio interface but, unlike conventional LTE eNBs (such as shown in FIG. 1), connect to the NGC via the NG interface.

Deployments based on different 3GPP architecture options (e.g., EPC-based or 5GC-based) and UEs with different capabilities (e.g., EPC NAS and 5GC NAS) may coexist at the same time within one network (e.g., PLMN). It is generally assumed that a UE that can support 5GC NAS procedures can also support EPC NAS procedures (e.g., as defined in 3GPP TS 24.301) to operate in legacy networks, such as when roaming. As such, the UE will use EPC NAS or 5GC NAS procedures depending on the core network (CN) by which it is served.

Another change in NG networks (e.g., in 5GC) is that traditional peer-to-peer interfaces and protocols (e.g., those found in LTE/EPC networks) are modified by a so-called Service Based Architecture (SBA) in which Network Functions provide one or more services to one or more service consumers. This can be done, for example, by Hyper Text Transfer Protocol/Representational State Transfer (HTTP/REST) application programming interfaces (APIs).

The services are composed of various "service operations", which are more granular divisions of the overall service functionality. In order to access a service, both the service name and the targeted service operation must be indicated. The interactions between service consumers and producers can be of the type "request/response" or "subscribe/notify". In the 5G SBA, network repository functions (NRF) allow every network function to discover the services offered by other network functions, and Data Storage Functions (DSF) allow every network function to store its context.

This architecture model, which further adopts principles like modularity, reusability and self-containment of network functions, can enable deployments to take advantage of the latest virtualization and software technologies.

Figure 2:
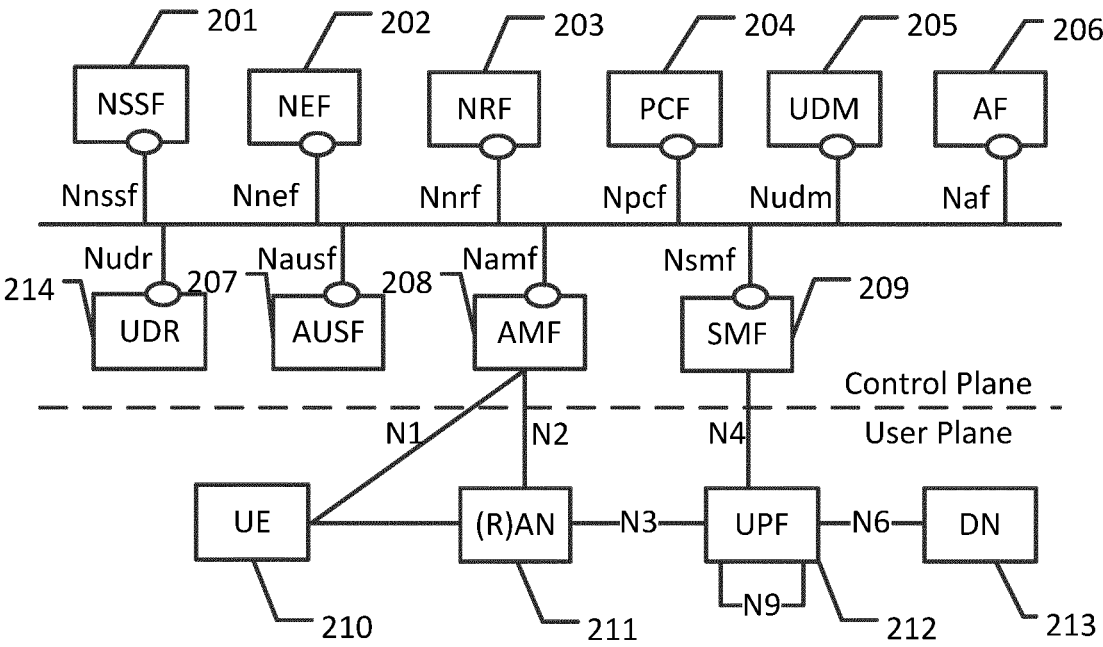
FIG. 2 illustrates a service-based architecture for an exemplary non-roaming 5G or Next Generation Core Network.

FIG. 2 illustrates a service-based architecture for an exemplary non-roaming 5G or Next Generation Core Network (5GCN/NGCN/NCN). This illustration depicts logical connections between nodes and functions, and its illustrated connections should not be interpreted as direct physical connections. UE 210 forms a radio access network connection with a (Radio) Access Network ((R)AN) node 211 (which may, for example, be an gNodeB (gNB)), which is connected to a CN User Plane (UP) Function (UPF) 212 such as a UP Gateway over a network interface providing a defined interface such as an N3 interface. UPF 212 provides a logical connection to a Data Network (DN) 213 over a network interface such as an N6 interface. The radio access network connection between the UE 210 and the (R)AN node may be referred to as a Data Radio Bearer (DRB).

DN 213 may be a data network used to provide an operator service, or it may be outside the scope of the standardization of the Third Generation Partnership Project (3GPP), such as the Internet, a network used to provide third party service, and in some embodiments DN 213 may represent an Edge Computing network or resource, such as a Mobile Edge Computing (MEC) network.

UE 210 also connects to the Access and Mobility Management Function (AMF) 208 through a logical NI connection (although the physical path of the connection is not direct). The AMF 208 is responsible for authentication and authorization of access requests, as well as mobility management functions. The AMF 208 may perform other roles and functions as defined by the 3GPP Technical Specification (TS) 23.501. In a service based view, AMF 208 can communicate with other core network control plane functions through a service based interface denoted as Namf.

The Session Management Function (SMF) 209 is a network function that is responsible for the allocation and management of IP addresses that are assigned to an ED as well as the selection of a UPF 212 (or a particular instance of a UPF 212) for traffic associated with a particular session of UE 210. It will be appreciated that there will typically be multiple SMFs 209 in the network 226, each of which may be associated with a respective group of UEs 210, (R)AN nodes 211 or UPFs 212. The SMF 209 can communicate with other core network functions, in a service based view, through a service based interface denoted as Nsmf. The SMF 209 may also connect to a UPF 212 through a logical interface such as network interface N4. There is also the possibility to use an SMF as an Intermediate SMF (I-SMF). I-SMF is an SMF that is inserted to support a PDU session as the UE is located in an area which cannot be controlled by the original SMF because the UPF(s) belong to a different SMF Service Area.

The Authentication Server Function (AUSF) 207, provides authentication services to other network functions over a service based Nausf interface.

A Network Exposure Function (NEF) 202 can be deployed in the network to allow servers, functions and other entities such as those outside a trusted domain to have exposure to services and capabilities within the network. In one such example, an NEF 202 can act much like a proxy between an application server outside the illustrated network and network functions such as the Policy Control Function (PCF) 204, the SMF 209, the UDM 205, and the AMF 208, so that the external application server can provide information that may be of use in the setup of the parameters associated with a data session. The NEF 202 can communicate with other network functions through a service based Nnef network interface. The NEF 202 may also have an interface to non-3GPP functions.

A Network Repository Function (NRF) 203, provides network element discovery functionality. The NRF 203 may be specific to the Public Land Mobility Network (PLMN) or network operator, with which it is associated. The service discovery functionality can allow network functions and UEs connected to the network to determine where and how to access existing network functions, and may present the service based interface Nnrf.

PCF 204 communicates with other network functions over a service based Npcf interface, and can be used to provide policy and rules to other network functions, including those within the control plane. Enforcement and application of the policies and rules is not necessarily the responsibility of the PCF 204, and is instead typically the responsibility of the functions to which the PCF 204 transmits the policy. In one such example the PCF 204 may transmit policy associated with session management to the SMF 209. This may be used to allow for a unified policy framework with which network behavior can be governed.

A Unified Data Management Function (UDM) 205 can present a service based Nudm interface to communicate with other network functions, and can provide data storage facilities to other network functions. Unified data storage can allow for a consolidated view of network information that can be used to ensure that the most relevant information can be made available to different network functions from a single resource. This can make implementation of other network functions easier, as they do not need to determine where a particular type of data is stored in the network. The UDM 205 may employ an interface, such as Nudr to connect to a User Data Repository (UDR) 214. The PCF 204 may be associated with the UDM 205 because it may be involved with requesting and providing subscription policy information to the UDR 214, but it should be understood that typically the PCF 204 and the UDM 205 are independent functions.

The PCF 204 may have a direct interface to the UDR 214 or can use Nudr interface to connect with UDR 214. The UDM 205 can receive requests to retrieve content stored in the UDR 214, or requests to store content in the UDR 214. The UDM 205 is typically responsible for functionality such as the processing of credentials, location management and subscription management. The UDR 214 may also support any or all of Authentication Credential Processing, User Identification handling, Access Authorization, Registration/Mobility management, subscription management, and Short Message Service (SMS) management. The UDR 214 is typically responsible for storing data provided by the UDM 205. The stored data is typically associated with policy profile information (which may be provided by PCF 204) that governs the access rights to the stored data. In some embodiments, the UDR 214 may store policy data, as well as user subscription data which may include any or all of subscription identifiers, security credentials, access and mobility related subscription data and session related data.

The Application Function (AF) 206 represents the non-data plane (also referred to as the non-user plane) functionality of an application deployed within a network operator domain and within a 3GPP compliant network. The AF 206 interacts with other core network functions through a service based Naf interface, and may access network capability exposure information, as well as provide application information for use in decisions such as traffic routing. The AF 206 can also interact with functions such as the PCF 204 to provide application specific input into policy and policy enforcement decisions. It should be understood that in many situations the AF 206 does not provide network services to other NFs, and instead is often viewed as a consumer or user of services provided by other NFs. An application outside the 3GPP network, can perform many of the same functions as AF 206 through the use of NEF 202.

The UE 210 communicates with network functions that are in the User Plane (UP), and the Control Plane (CP). The UPF 212 is a part of the CN UP (DN 213 being outside the 5GCN). (R)AN node 211 may be considered as a part of a User Plane, but because it is not strictly a part of the CN, it is not considered to be a part of the CN UP or UPF 212. AMF 208, SMF 209, AUSF 207, NEF 202, NRF 203, PCF 204, and UDM 205 are functions that reside within the CN CP, and are often referred to as Control Plane Functions. AF 206 may communicate with other functions within CN CP (either directly or indirectly through the NEF 202), but is typically not considered to be a part of the CN CP.

Those skilled in the art will appreciate that there may be a plurality of UPFs connected in series between the (R)AN node 211 and the DN 213, and multiple data sessions to different DNs can be accommodated through the use of multiple UPFs in parallel.

Figure 3:
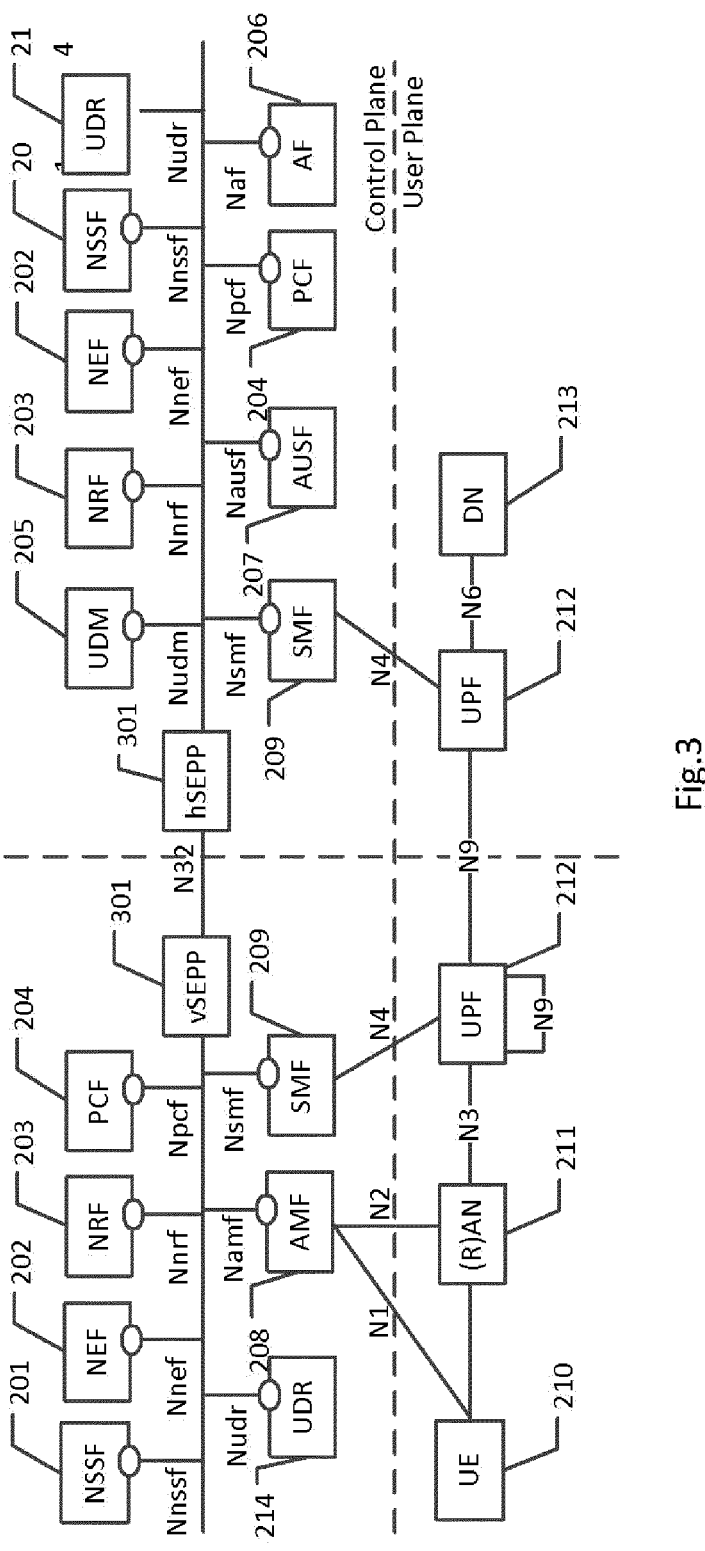
FIG. 3 illustrates a service-based architecture for an exemplary roaming 5G or Next Generation Core Network.

FIG. 3 illustrates a service-based architecture for an exemplary roaming 5G or Next Generation Core Network. In this architecture, the user roams into a Visited Public Land Mobile Network (VPLMN) that is different than the user's Home PLMN (HPLMN). In particular, FIG. 3 shows a roaming architecture that supports home-routed data services, in which the home operator's administrative domain is involved in the user's data session and the UE interfaces the data network (DN) in the HPLMN. From the user's perspective, the various network functions of the HPLMN shown in the non-roaming architecture of FIG. 2 are distributed among the HPLMN and VPLMN in the home-routed roaming architecture shown in FIG. 3. For example, the AMF is in the VPLMN, the AUSF is in the HPLMN, and the SMF and UPF exist in both (e.g., are split between) VPLMN and HPLMN. To distinguish between these functions existing in both networks, a prefix of "H" or "V" can be used, such as "H-UPF" and "V-UPF", as well as "V-SMF" and "H-SMF".

In the roaming architecture that supports home-routed data services, Security Edge Protection Proxy (SEPP) 301, as a service-based security proxy gateway, implements message filtering and supervision of the control plane interface between PLMNs (e.g., H-PLMN and V-PLMN), and provides security for all service information exchanged between two NFs across PLMNs. The H-SMF and the V-SMF communicates through the N16 interface, the H-UPF and the V-UPF communicate through the N9 interface, and the H-SEPP and the V-SEPP communicate through the N32 interface. The home network will provide session management and service control. All control plane traffic returns to the home network through the N16 interface.

As recited in the Background section, In EPC, MME will do the selection with the aid of DNS, where whether a gateway is a PGW or a SGW could be identified by its interface information stored in the DNS.

In 5G core, in terms of selecting the SMF, the AMF queries the NRF to get the SMF information and then selects the SMF based on knowledge of the SMF information from the NRF. However, the AMF has no idea about the capability of the SMF-a capability of support of one or more of V-SMF, H-SMF or I-SMF, and can't select by the capability. In some scenarios, the knowledge of the capability of the SMF is required, such as in a roaming scenario, a V-SMF which comprises an N16 interface is required, wherein the N16 interface is a reference point between SMF in the visited network (i.e. V-SMF) and the SMF in the home network (i.e., H-SMF) in roaming case. Finally an SMF not in support of V-SMF may be selected and the service may not work well. This lack of knowledge may limit or impair deployment possibilities for certain network setups, e.g., dedicated V-SMF or I-SMF with partial coverage of Public Land Mobile Network (PLMN).

Figure 4A:
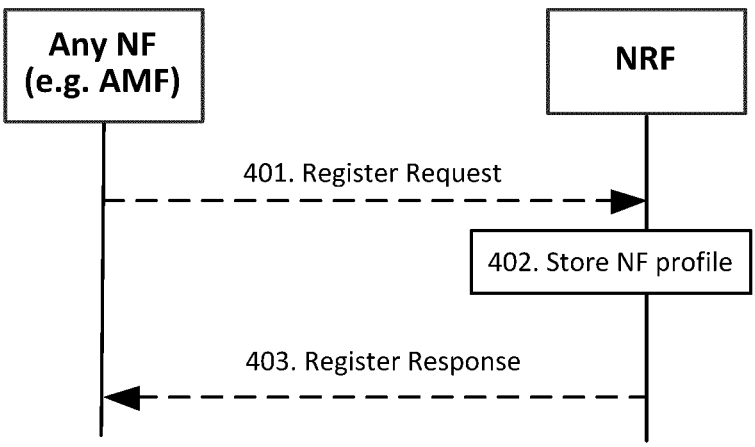
FIG. 4a illustrates an NF service registration procedure according to embodiments of the present disclosure.

FIG. 4a-4d each illustrates a flowchart of a detailed embodiment according to embodiments of the present disclosure. FIG. 4a illustrates an NF service registration procedure according to embodiments of the present disclosure.

At step 401, NF service consumer, i.e. an NF instance (e.g. AMF) sends a register request message (e.g. Nnrf_NF-Management_NFRegister Request) to NRF to inform the NRF of its NF profile when the NF service consumer becomes operative for the first time, wherein the Request message indicates a capability of the NF service consumer, e.g. a capability of support of one or more of H-SMF, V-SMF or I-SMF. It is noted the term "NF service consumer" in this clause refers to the consumer of the NRF services and should not be confused with the role of the NF (consumer or producer).

At step 402, the NRF stores the NF profile of NF service consumer, including the capability of the NF service consumer, and marks the NF service consumer available.

At step 403, the NRF acknowledge NF Registration is accepted via a Register response message (e.g. Nnrf_NF-Management_NFRegister response).

Figure 4B:
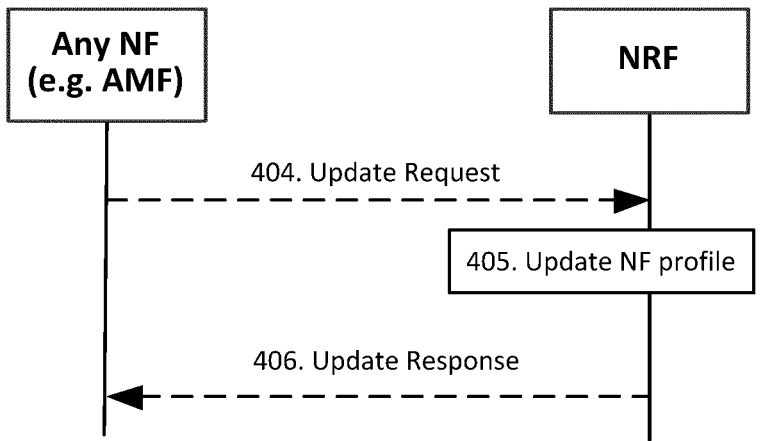
FIG. 4b illustrates an NF service update procedure according to embodiments of the present disclosure.

FIG. 4b illustrates an NF service update procedure according to embodiments of the present disclosure.

At step 404, the NF service consumer i.e. an NF instance (e.g. AMF) sends an update request message (e.g. Nnrf_NF-Management_NFUpdate Request), i.e., the updated NF profile of NF service consumer to NRF to inform the NRF of its updated NF profile, the update request indicates updated capability of the NF service consumer, e.g. a capability of support of one or more of H-SMF, V-SMF or I-SMF when e.g. triggered by some operation.

At step 405, the NRF stores (i.e., updates) the NF profile of NF service consumer, and at Step 406, the NRF acknowledge NF Update is accepted via an update response message (e.g. Nnrf_NFManagement_NFUpdate response).

It is noted that other procedure may also apply if the profile of NF in NRF is affected.

It is noted that the messages mentioned above may be sent directly, or via some other network element(s).

Figure 4C:
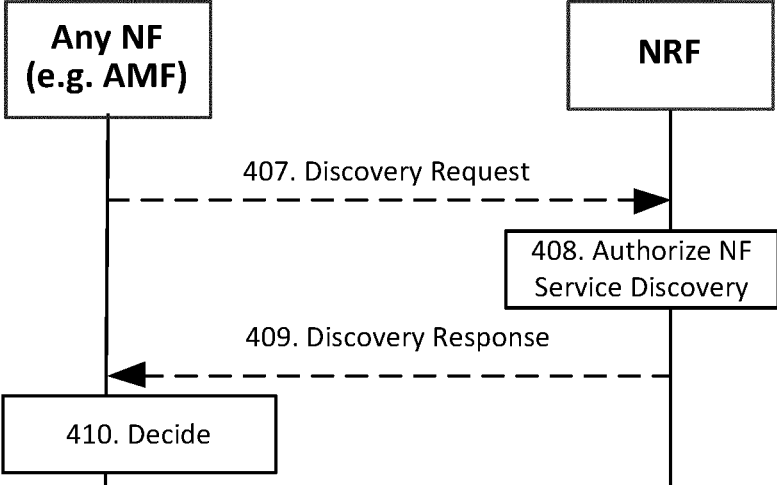
FIG. 4c illustrates an NF service discovery procedure according to embodiments of the present disclosure.

FIG. 4c illustrates an NF service discovery procedure according to embodiments of the present disclosure.

At step 407, The NF service consumer i.e. an NF instance (e.g. AMF) intends to discover services available in the network based on service name and target NF type, e.g., SMF. The NF service consumer invokes discovery procedure with NRF, using such as Nnrf_NFDiscovery_Request message (Expected NF service Name, NF Type, e.g. AMF, of the expected NF instance, NF type, e.g. AMF, of the NF consumer) with an appropriate configured NRF in the same PLMN. The parameters in the discovery request message may vary depending on the NF type and network deployment, etc. In an example, the discovery request message indicates a preferred capability of the NF, such as a preferred capability of support of one or more of I-SMF, H-SMF or V-SMF.

At step 408, the NRF authorizes the discovery request (e.g., Nnrf_NFDiscovery_Request). Based on the profile of the expected NF/NF service and the type of the NF service consumer, the NRF determines whether the NF service consumer is allowed to discover the expected NF instance(s). If the expected NF instance(s) or NF service instance(s) are deployed in a certain network slice, NRF authorizes the discovery request according to the discovery configuration of the Network Slice, e.g. the expected NF instance(s) are only discoverable by the NF in the same network slice.

At step 409, if allowed, the NRF determines a set of NF instance(s) matching the Nnrf_NFDiscovery_Request and internal policies of the NRF, and sends the NF profile(s) of the determined NF instances.

If the NF service consumer provided a preferred capability, e.g., an AMF instance provided a preferred capability of support of one or more of I-SMF, H-SMF or V-SMF, the NRF may try to limit the set of discovered NF instances or NF service instance(s) to the preferred capability, e.g. the NRF may provide SMF instance(s) or SMF service instance(s) whose capability is "only support V-SMF", "support both H-SMF and I-SMF", etc., while it may also leave it for the NF to decide it at step 410. If the capability information is not available in the NRF, or NF instances or service instance(s) with the preferred capability are not available, the NRF will follow the legacy technology, i.e., do not limit the set of discovered NF instances or NF service instance(s) to the preferred capability.

Figure 4D:
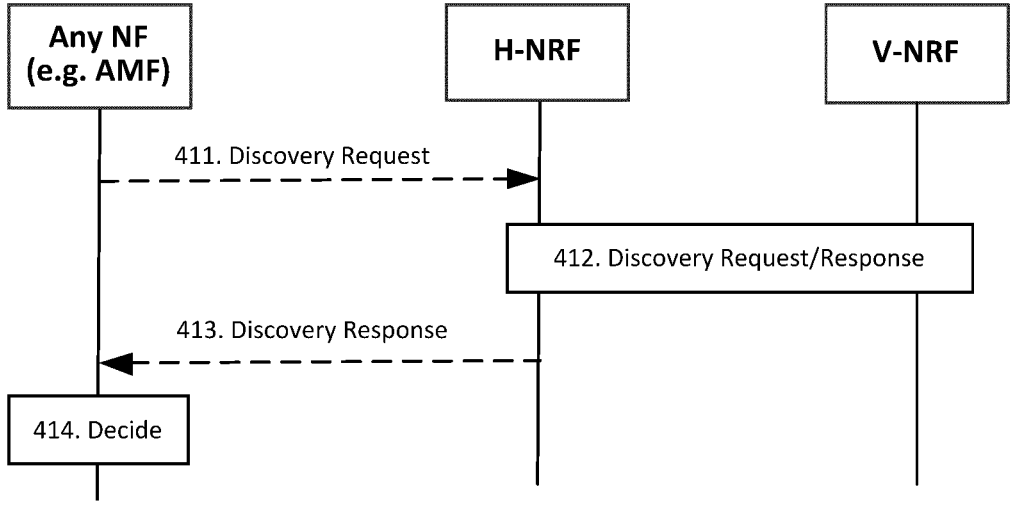
FIG. 4d illustrates another NF service discovery procedure according to embodiments of the present disclosure.

FIG. 4d illustrates another NF service discovery procedure according to embodiments of the present disclosure. It is noted that the NRF may not necessarily locates in the same PLMN as the requesting NF does.

At step 411, the NF service consumer i.e. an NF instance (e.g. AMF) in the serving PLMN invokes discovery procedure with NRF, using such as Nnrf_NFDiscovery_Request message (Expected Service Name, NF type of the expected NF, home PLMN ID, serving PLMN ID, NF type, e.g. AMF, of the NF service consumer) with an appropriate configured NRF in the serving PLMN. The parameters in the discovery request message may vary depending on the NF type and network deployment, etc. In an example, the discovery request message indicates a preferred capability of the NF, such as a preferred capability of support of one or more of I-SMF, H-SMF or V-SMF.

At step 412, The NRF in VPLMN and NRF in HPLMN interact using discovery request/response, e.g. the Nnrf_NF-Discovery.

At step 413, the NF instance gets a set of NF instance(s) matching the discovery request (e.g., Nnrf_NFDiscovery_Request) etc., in particular the preferred capability.

If the NF service consumer provided a preferred capability, e.g., an AMF instance provided a preferred capability of support of one or more of I-SMF, H-SMF or V-SMF, the NRF may try to limit the set of discovered NF instances or NF service instance(s) to the preferred capability, e.g. the H-NRF may provide SMF instance(s) or SMF service instance(s) whose capability is "only support V-SMF", "support both H-SMF and I-SMF", etc., while it may also leave it for the NF to decide it at step 414. If the capability information is not available in the H-NRF, or NF instances or service instance(s) with the preferred capability are not available, the NRF will follow the legacy technology, i.e., do not limit the set of discovered NF instances or NF service instance(s) to the preferred capability.

FIG. 5a illustrates a flowchart of an embodiment for a UE service management network element according to embodiments of the present disclosure.

At step 501, the UE service management network element sends a request to a network function discovery network element, which request indicates a capability of the UE service management network element to affect profile of the UE service management network element stored in the network function discovery network element in a communication network.

In response, the UE service management network element receives a reply for acknowledgement at step 502.

In an example, the request comprises one of: a register request or an update request, accordingly, the reply is register reply or update reply.

In an example, the UE service management network element comprises an SMF network element, and the capability comprises a capability of support of one or more of V-SMF, H-SMF and I-SMF.

In an example, the network function discovery network element comprises an NRF network element.

In an example, the communication network comprises a 5G network.

FIG. 5*b* illustrates a flowchart of an embodiment for a network function selection network element according to embodiments of the present disclosure.

At step 503, a network function selection network element sends a request to a network function discovery network element for information of one or more candidate network elements from which a UE service management network element will be selected. In an example, the request indicates a preferred capability of the UE service management network element.

At step 504, it is determined whether information of the one or more candidate network elements indicating capability of at least one of the one or more candidate network elements is received, and at step 505, in response to receiving information of the one or more candidate network elements indicating the capability, the network function selection network element determines the UE service management network element from the one or more candidate network elements. At step 506, in response to receiving information of the one or more candidate network elements which does not indicate a capability of the one or more candidate network elements, the network function selection network element determines the UE service management network element from the one or more candidate network elements without considering the preferred capability.

In an example, the UE service management network element comprises a SMF network element, and the preferred capability comprises a preferred capability of support of one or more of V-SMF, H-SMF or I-SMF.

In an example, the network function selection network element comprises an AMF network element.

In an example, the communication network comprises a 5G network.

FIG. 5*c* illustrates a flowchart of an embodiment for a network function discovery network element according to embodiments of the present disclosure. At step 507, in response to receiving, from a network function selection network element, a request for information of one or more candidate network elements from which a UE service management network element will be selected, a network function discovery network element performs discovery of the one or more candidate network elements.

In an example, the network function discovery network element performs discovery of the one or more candidate network elements considering the preferred capability of the UE service management network element, while in another example, it may leave it for the network function selection network element to decide it.

At step 508, in response to determining from the discovery that information of the one or more candidate network elements with the preferred capability of the UE service management network element is available, the network function discovery network element sends, to the network function selection network element, information of the one or more candidate network elements with the preferred capability of the UE service management network element, which information indicates a capability of the one or more candidate network elements.

It is noted that the capability of each the one or more candidate network elements indicated in the information sent from the he network function discovery network element may be exactly the same as the preferred capability, or may include some other capabilities in addition to the preferred capability.

In one example, the information sent from the he network function discovery network element is profile of the one or more candidate network elements. The network element with capability of e.g. only support of V-SMF which is exactly the same as the preferred capability, or of e.g. support of H-SMF in addition to the preferred capability-support of V-SMF may both be determined as the candidate network element. Then the network function selection network element will do the selection when e.g. a capability of support of only V-SMF is required.

In another example, the information sent from the he network function discovery network element is still profile of the one or more candidate network elements. The network element with capability of e.g. only support of V-SMF which is exactly the same as the preferred capability is determined as the candidate network element, but the network element with capability of e.g. support of H-SMF in addition to the preferred capability-support of V-SMF is not determined as the candidate network element, i.e., profile of the candidate network element only comprise exactly the same capability as the preferred capability.

It is noted that we use the singular form of the word "capability" to refer to probably multiple capabilities, as they as a whole could be regarded as a capability of a UE service management network element.

At step 509, in response to determining from the discovery that information of the one or more candidate network elements with the preferred capability of the UE service management network element is not available, the network function discovery network element sends information of other one or more UE service management network element without considering the preferred capability.

In an example, the information of the one or more candidate network elements with the preferred capability of the UE service management network element is not available means: information of the capability of the UE service management network element is not available.

In an example, the information of the one or more candidate network elements with the preferred capability of the UE service management network element is not available means: the one or more candidate network elements with the preferred capability of the UE service management network element is not available.

At step 510, in response to receiving a request from a UE service management network element to affect profile of the UE service management network element stored in the network function discovery network element, wherein the request indicates a capability of the UE service management network element, the network function discovery network element stores the capability of the UE service management network element in profile of the UE service management network element.

In an example, the UE service management network element comprises a SMF network element, the capability comprises a capability of support of one or more of V-SMF, H-SMF or I-SMF, and the preferred capability comprises a preferred capability of support of one or more of V-SMF, H-SMF and I-SMF.

In an example, the network function discovery network element comprises an NRF network element.

In an example, the network function selection network element comprises an AMF network element.

In an example, the communication network comprises a 5G network.

FIG. 5*d* illustrates another flowchart of an embodiment for a network function discovery network element according to embodiments of the present disclosure. At step 512, in response to receiving, from a network function selection network element, a request for information of one or more candidate network elements from which a UE service management network element will be selected, a network function discovery network element performs discovery of the one or more candidate network elements.

In an example, the network function discovery network element performs discovery of the one or more candidate network elements considering the preferred capability of the UE service management network element, while in another example, it may leave it for the network function selection network element to decide it.

At step 513, in response to determining from the discovery that information of the one or more candidate network elements is available based on the request and some other principles, the network function discovery network element sends, to the network function selection network element, information of the one or more candidate network elements, which information indicates a capability of the one or more candidate network elements.

It is noted that the capability of each the one or more candidate network elements indicated in the information sent from the he network function discovery network element may be exactly the same as the preferred capability, or may include some other capabilities in addition to the preferred capability.

In an example, the network function discovery network element comprises an NRF network element.

In an example, the network function selection network element comprises an AMF network element.

In an example, the communication network comprises a 5G network.

FIG. 6a illustrates a schematic block diagram of a UE service management network element to affect profile of the UE service management network element stored in a network function discovery network element, operative in a communication network according to embodiments of the present disclosure. The UE service management network element may be a SMF, the network function discovery network element may be a NRF, and the communication network here may be a 5G network, a 5G network in combination with a 4G network, or any other appropriate network.

The part of the UE service management network element 61 which is most affected by the adaptation of the herein described method, e.g., a part of the method described with reference to FIGS. 4a, 4b and 5a, is illustrated as an arrangement 611, surrounded by a dashed line. The UE service management network element 61 and arrangement 611 may be further configured to communicate with other entities such as a network element of NF discovery via a communication component 612 which may also be regarded as part of the arrangement 611 (now shown). The communication component 612 comprises means for communication. The arrangement 611 or the UE service management network element 61 may further comprise a further functionality 614, such as functional components providing regular UE functions, and may further comprise one or more storage(s) 613.

The arrangement 611 could be implemented, e.g., by one or more of: a processor or a microprocessor and adequate software and memory for storing of the software, a Programmable Logic Device (PLD) or other electronic component(s) or processing circuitry configured to perform the actions described above, and illustrated, e.g., in FIGS. 4a and/or 4b. The arrangement 611 of the UE service management network element may be implemented and/or described as follows.

Referring to FIG. 6a, the UE service management network element may comprise a request sending component 6111.

The request sending component 6111 is configured to send a request to the network function discovery network element, wherein the request indicates a capability of the UE service management network element.

Details on how to perform NF register and update have been described with reference to FIGS. 4a, 4b and 5a, and will not be reiterated here.

It should be noted that two or more different units in this disclosure may be logically or physically combined.

FIG. 6b illustrates a schematic block diagram of a network function selection network element according to embodiments of the present disclosure. The network function selection network element may be an AMF. The communication network here may be a 5G network, a 5G network in combination with a 4G network, or any other appropriate network.

The part of network function selection network element 62 which is most affected by the adaptation of the herein described method, e.g., a part of the method described with reference to FIGS. 4b, 4c and 5b, is illustrated as an arrangement 621, surrounded by a dashed line. The network function selection network element and arrangement 621 are further configured to communicate with other entities such as the network element of NF discovery via a communication component 622 which may be regarded as part of the arrangement 621. The communication component 622 comprises means for communication, and may also comprise means for, e.g., wired communication. The arrangement 621 or the network function selection network element may further comprise a further functionality 624, such as functional components providing regular base station functions, and may further comprise one or more storage (3) 623.

The arrangement 621 could be implemented, e.g., by one or more of: a processor or a microprocessor and adequate software and memory for storing of the software, a Programmable Logic Device (PLD) or other electronic component(s) or processing circuitry configured to perform the actions described above, and illustrated, e.g., in FIG. 4b. The arrangement part of the network function selection network element may be implemented and/or described as follows.

Referring to FIG. 6b, the network function selection network element may include a discovery request component 6211 and a determining component 6212.

The discovery request component 6211 is configured to send a request to a network function discovery network element for information of one or more candidate network elements from which the UE service management network element will be selected, wherein the request may indicates a preferred capability of the UE service management network element in an example.

The determining component 6212 is configured to, in response to receiving information of the one or more candidate network elements which information indicates capability of at least one of the one or more candidate network elements: determining the service management network element from the at least one of the one or more candidate network elements considering a preferred capability of the UE service management network element.

The network function discovery network element may be a NRF.

It should be noted that two or more different units in this disclosure may be logically or physically combined.

FIG. 6c illustrates a schematic block diagram of a network function discovery network element operative in a communication network according to embodiments of the present disclosure. The network function discovery network element may be a NRF. The communication network here may be a 5G network, a 5G network in combination with a 4G network, or any other appropriate network.

The part of network function discovery network element 63 which is most affected by the adaptation of the herein described method, e.g., a part of the method described with reference to FIGS. 4a-4d and 5c, is illustrated as an arrangement 631, surrounded by a dashed line. The network function discovery network element and arrangement 631 are further configured to communicate with other entities such as the network function selection network element via a communication component 632 which may be regarded as part of the arrangement 631. The communication component 632 comprises means for communication, and may also comprise means for, e.g., wired communication. The arrangement 631 or the network function selection network element may further comprise a further functionality 634, such as functional components providing regular base station functions, and may further comprise one or more storage (3) 633.

The arrangement 631 could be implemented, e.g., by one or more of: a processor or a microprocessor and adequate software and memory for storing of the software, a Programmable Logic Device (PLD) or other electronic component(s) or processing circuitry configured to perform the actions described above, and illustrated, e.g., in FIG. 4b. The arrangement part of the network function selection network element may be implemented and/or described as follows.

Referring to FIG. 6c, the network function selection network element may include a discovery component 6311 and a sending component 6312.

The discovery component is configured to, in response to receiving, from a network function selection network element, a request for information of one or more candidate network elements from which a UE service management network element will be selected, wherein the request indicates a preferred capability of the UE service management network element, perform discovery of the one or more candidate network elements with the preferred capability of the UE service management network element.

The sending component is configured to, in response to determining from the discovery that information of the one or more candidate network elements with the preferred capability of the UE service management network element is available, send, to the network function selection network element, information of the one or more candidate network elements with the preferred capability of the UE service management network element, which information indicates a capability of the candidate.

The network function selection network element may be an AMF and the UE service management network element may be an SMF.

It should be noted that two or more different units in this disclosure may be logically or physically combined.

FIG. 7 schematically shows an embodiment of an arrangement 700 which may be used in the UE service management network element or the network function selection network element. Comprised in the arrangement 700 are here a processor 706, e.g., with a Digital Signal Processor (DSP). The processor 706 may be a single unit or a plurality of units to perform different actions of procedures described herein. The arrangement 700 may also comprise an input unit 702 for receiving signals from other entities, and an output unit 704 for providing signal(s) to other entities. The input unit and the output unit may be arranged as an integrated network element or as illustrated in the example of FIG. 6a-6c.

Furthermore, the arrangement 700 comprises at least one computer program product 708 in the form of a non-volatile or volatile memory, e.g., an Electrically Erasable Programmable Read-Only Memory (EEPROM), a flash memory and a hard drive, and those from a cloud connected via the input unit 702 and output unit 704. The computer program product 708 comprises a computer program 710, which comprises code/computer readable instructions, which when executed by the processor 706 in the arrangement 700 causes the arrangement 700 and/or the UE service management network element or the network function selection network element in which it is comprised to perform the actions, e.g., of the procedure described earlier in conjunction with FIGS. 4a-4c or FIGS. 5a-5c.

The computer program 710 may be configured as a computer program code structured in computer program modules. Hence, in an exemplifying embodiment when the arrangement 700 is used in the UE service management network element, the code in the computer program of the arrangement 700 when executed, will cause the processor 706 to perform the steps as described with reference to FIG. 5a.

In another exemplifying embodiment when the arrangement 700 is used in the network function selection network element, the code in the computer program of the arrangement 700 when executed, will cause the processor 706 to perform the steps as described with reference to FIG. 5b.

In another exemplifying embodiment when the arrangement 700 is used in the network function discovery network element, the code in the computer program of the arrangement 700 when executed, will cause the processor 706 to perform the steps as described with reference to FIG. 5c.

The processor 706 may be a single Central Processing Unit (CPU), but could also comprise two or more processing units. For example, the processor 706 may include general purpose microprocessors, instruction set processors and/or related chip sets and/or special purpose microprocessors such as Application Specific Integrated Circuits (ASIC). The processor 706 may also comprise board memory for caching purposes. The computer program 710 may be carried by a computer program product 708 connected to the processor 706. The computer program product may comprise a computer readable medium on which the computer program is stored. For example, the computer program product may be a flash memory, a Random-access memory (RAM), a Read-Only Memory (ROM), or an EEPROM, and the computer program modules described above could in alternative embodiments be distributed on different computer program products in the form of memories.

As a whole or by scenario, by identifying a NF capability in NRF, some deployment possibilities relying on the information of the NF capability (such as a capability of support of one or more of V-SMF, I-SMF or H-SMF) may be enabled, for example, an operator can manage its V-SMF, I-SMF and H-SMF coverage in the communication network, and separating roaming traffic from home traffic in SMF.

While the embodiments have been illustrated and described herein, it will be understood by those skilled in the art that various changes and modifications may be made, and equivalents may be substituted for elements thereof without departing from the true scope of the present technology. In addition, many modifications may be made to adapt to a particular situation and the teaching herein without departing from its central scope. Therefore it is intended that the present embodiments not be limited to the particular embodiment disclosed as the best mode contemplated for carrying out the present technology, but that the present embodiments include all embodiments falling within the scope of the appended claims.

The invention claimed is:

1. A method for a user equipment, UE, service management network element to affect profile of the UE service management network element stored in a network function discovery network element in a communication network, comprising:

sending a register request to the network function discovery network element to register a profile of the UE service management network element stored in the network function discovery network element or an update request to the network function discovery network element to update the profile of the UE service management network element stored in the network function discovery network element, wherein the register request or the update request indicates a capability of the UE service management network element.

2. The method of claim 1, wherein the UE service management network element comprises a session management function, SMF, network element, and the capability comprises capability of support of one or more of V-SMF, H-SMF and I-SMF.

3. The method of claim 1, wherein the network function discovery network element comprises a network repository function, NRF, network element.

4. The method of claim 1, wherein the communication network comprises a fifth generation network.

5. A method for a network function selection network element to select a user equipment, UE, service management network element, in a communication network, comprising:

sending, via a discovery request component, a request to a network function discovery network element for information of one or more candidate network elements from which the UE service management network element will be selected, wherein the request indicates a preferred capability of the UE service management network element; and in response to receiving information of the one or more candidate network elements which information indicates capability of at least one of the one or more candidate network elements:

determining, via a determining component, the service management network element from the at least one of the one or more candidate network elements considering a preferred capability of the UE service management network element.

6. The method of claim 5, further comprising:

in response to receiving information of the one or more candidate network elements which information does not indicate capability of the one or more candidate network elements, determining the UE service management network element from the one or more candidate network elements without considering the preferred capability.

7. The method of claim 5, wherein the UE service management network element comprises a session management function, SMF, network element, and the preferred capability comprises a preferred capability of support of one or more of V-SMF, H-SMF or I-SMF.

8. The method of claim 5, wherein the network function selection network element comprises an access and mobility management function, AMF, network element.

9. The method of claim 5, wherein the communication network comprises a fifth generation network.

10. A method for a network function discovery network element in a communication network, comprising:

in response to receiving, from a network function selection network element, a request for information of one or more candidate network elements from which a user equipment, UE, service management network element will be selected, wherein the request indicates a preferred capability of the UE service management network element:

performing discovery of the one or more candidate network elements with the preferred capability of the UE service management network element; and in response to determining from the discovery that information of the one or more candidate network elements with the preferred capability of the UE service management network element is available:

sending, to the network function selection network element, information of the one or more candidate network elements with the preferred capability of the UE service management network element, which indicates a capability of the one or more candidate network elements including the preferred capability.

11. The method of claim 10, further comprising:

in response to determining from the discovery that information of the one or more candidate network elements with the preferred capability of the UE service management network element is not available, sending information of other one or more UE service management network elements without considering the preferred capability.

12. The method of claim 11, wherein the information of the one or more candidate network elements with the preferred capability of the UE service management network element is not available comprises one or more of:

information of the capability of the UE service management network element is not available, or the one or more candidate network elements with the preferred capability of the UE service management network element is not available.

13. The method of claim 10, further comprising:

in response to receiving a request from a UE service management network element to affect profile of the UE service management network element stored in the network function discovery network element, wherein the request indicates capability of the UE service management network element, storing the capability of the UE service management network element in profile of the UE service management network element.

14. The method of claim 10, wherein the UE service management network element comprises a session management function, SMF, network element, the capability comprises capability of support of one or more of V-SMF, H-SMF or I-SMF, and the preferred capability comprises a preferred capability of support of one or more of V-SMF, H-SMF and I-SMF.

15. The method of claim 10, wherein the network function discovery network element comprises a network repository function, NRF, network element.

16. The method of claim 10, wherein the network function selection network element comprises an access and mobility management function, AMF, network element.

17. The method of claim 10, wherein the communication network comprises a fifth generation network.

18. A user equipment, UE, service management network element to affect profile of the UE service management network element stored in a network function discovery network element, operative in a communication network, comprising:

a request sending component, configured to send a register request to the network function discovery network element to register a profile of the UE service management network element stored in the network function discovery network element or an update request to the network function discovery network element to update the profile of the UE service management network element stored in the network function discovery network element, wherein the register request of the update request indicates capability of the UE service management network element.

19. A network function selection network element to select a user equipment, UE, service management network element operative in a communication network, comprising:

a discovery request component, configured to send a request to a network function discovery network element for information of one or more candidate network elements from which the UE service management network element will be selected, wherein the request indicates a preferred capability of the UE service management network element; and a determining component, configured to, in response to receiving information of the one or more candidate network elements which information indicates capability of at least one of the one or more candidate network elements:

determine the service management network element from the at least one of the one or more candidate network elements considering a preferred capability of the UE service management network element.

20. A network function discovery network element operative in a communication network, comprising:

a discovery component, configured to, in response to receiving, from a network function selection network element, a request for information of one or more candidate network elements from which a user equipment, UE, service management network element will be selected, wherein the request indicates a preferred capability of the UE service management network element, perform discovery of the one or more candidate network elements with the preferred capability of the UE service management network element; and a sending component, configured to, in response to determining from the discovery that information of the one or more candidate network elements with the preferred capability of the UE service management network element is available, send, to the network function selection network element, information of the one or more candidate network elements with the preferred capability of the UE service management network element, which indicates a capability of the candidate network elements including the preferred capability.

* * * * *